United States Patent [19]

Idstein et al.

[11] 4,073,489
[45] Feb. 14, 1978

[54] DOCUMENT TRANSPORT DEVICE

[75] Inventors: Hermann Idstein, Oestrich-Winkel;
Peter Loew, Wallau, both of Germany

[73] Assignee: Hoechst Aktiengesellschaft, Frankfurt am Main, Germany

[21] Appl. No.: 771,779

[22] Filed: Feb. 24, 1977

[30] Foreign Application Priority Data

Feb. 26, 1976 Germany ............................. 2607774

[51] Int. Cl.² ............................................. B65H 29/06
[52] U.S. Cl. ....................................... 271/277; 271/82
[58] Field of Search .................. 271/277, 82, 204, 206

[56] References Cited

U.S. PATENT DOCUMENTS

| 3,944,218 | 3/1976 | Cerny ................................ 271/82 X |
| 4,033,575 | 7/1977 | Fujimoto ........................... 271/82 X |

Primary Examiner—Richard A. Schacher
Attorney, Agent, or Firm—Richard L. Schwaab

[57] ABSTRACT

Disclosed is a device for transporting an original to be copied while resting on a supporting surface, preferably a drum, in a reproduction apparatus, comprising: a shaft extending across the width of the supporting surface and being arranged in spaced relationship substantially parallel therewith; a plurality of means in spaced attachment along the shaft and responsive to rotation of the shaft for clamping the leading edge of the original; a flexible strip member commonly covering the clamping means and being adapted to protect the leading edge of the original in the clamped position; means engaging one end of the shaft in an original-receiving position for opening and closing the clamping means by rotating the shaft; and means engaging one end of the shaft in an original-releasing position for opening the clamping means by rotating the shaft.

21 Claims, 5 Drawing Figures

DOCUMENT TRANSPORT DEVICE

BACKGROUND OF THE INVENTION

The present invention relates to a transport device for transporting an original to be copied, while resting on a support surface, through the processing stations of a reproducing or copying machine, the transport device comprising gripping elements spaced across the width of the support surface and holding the leading edge of the original during transport.

In copying and reproducing machines several devices are already known for holding the leading edge of a moving original. For example, in German Offenlegungsschrift No. 2,026,063 a drum of a copying machine is described which is provided with a number of projecting grippers arranged across the surface of the drum and clamping the leading edge of an original to be copied. Each gripper is fastened in the drum by means of locking blocks accommodating an operating rod for actuating the grippers. For this purpose, the insides of the grippers at their bases each interact with a respective flattened portion of the operating rod. When the rod is turned clockwise, the grippers are withdrawn from the surface of the drum against the action of a spring which normally presses the grippers onto the surface of the drum and it is thus possible to place on or remove from the drum an original to be copied. In this known device each gripper is individually mounted in the drum, and consequently the gripping device is technically complicated and expensive.

From German Offenlegungsschrift No. 2,365,228 a gripping device is known which comprises a clamping bar provided with a number of grippers. This clamping bar is arranged inside of a drum in a radial slot, and in order to clamp the paper original inserted into the slot, the clamping bar is pressed onto a clamping surface inside the drum by means of a lever arrangement actuated by an electromagnet having an armature. When the clamping bar is opened, the grippers slightly project beyond the surface of the drum, so that an original can be placed underneath them. In this known gripping device having a rigid clamping bar, difficulties arise, inter alia, due to the fact that it is not possible to compensate for varying thicknesses at the margins of an original to be copied across its width. As a result, the entire clamping force of the clamping bar, at best, acts upon the margins on the right and on the left of the original, but not in between, since in this area the clamping bar does not rest upon the original. As is known from experience, the major clamping force of such a clamping bar is exerted at the point of maximum thickness of the original, and due to the unequal clamping force across the width of the original, the latter may tear, slip, bulge or be destroyed during transport. Since the control means for opening and closing this known gripping device is positioned outside the drum, additional room is required, a fact which precludes the desired compact design in reproducing and photocopying machines.

A known gripping device described in German Offenlegungsschrift No. 2,343,133 is mounted on an endless transport system, e.g., formed by two chains, and comprises a metal gripping frame attached to the transport chains, movable metal clamps, and pads which are to avoid any scratching or other damaging of the photoconductive drum when the gripping device approaches the drum. In this case, the gripping device does not rotate with the photoconductive drum, but only leads the copying material, onto which the developed powder image is to be transferred, past the transfer station of the photoconductive drum. The movable clamps are prestressed by springs and are opened by rigid pins in such a way that they are lifted off from a stationary clamp of the metal gripping frame.

Although the known gripping devices, either consisting of a drum with individual mounted grippers or of a rigid clamping bar extending across the surface of the drum, accomplish their task of conveying the originals to be copied, it is difficult, with those devices, to make copies of originals which have slightly damaged leading edges or which vary in thickness across their width, as for instance originals provided with a suspension strip on one side, which strip is normally much thicker than the original to be copied.

The known gripping system with individually mounted flexible grippers seizes the leading edge of an original to be copied in predetermined areas and exerts a largely uniform grip force. It is also suited for originals with suspension strips of different thicknesses, but it has the disadvantage that the leading edge of the original is not covered over its entire width. It is, however, necessary to cover the entire leading edge of an original, when the leading edge is damaged, e.g., when it is torn or deformed. During transport of the original to be copied through a copying or reproducing machine, especially when further rolls, webs and similar transporting elements pass over its leading edge, such damage may be aggravated or the original may even be destroyed. This may happen in particular when the original is transported through the machine several times for repeated copying.

A gripping system comprising a rigid clamping bar covers and protects the entire leading edge of the original; however, it is not able to compensate for a differing thickness across the leading edge of the original caused by the difference in gauge between paper and suspension strip. Thus, the clamping bar exerts a non-uniform clamping force across the width of the leading edge. As mentioned before, tearing, slipping, bulging or other damaging of the original to be copied may result.

The control systems incorporated in the known gripping devices either deviate each gripper individually and in parallel with the other grippers in the gripping system, or they displace a clamping bar with respect to a clamping surface inside of a drum.

SUMMARY OF THE INVENTION

It is an object of the present invention to provide an improved transport device of the above-mentioned type.

It is a further object of the invention to provide such an improved device wherein originals are safely and carefully guided through the machine.

A further object of the invention resides in providing an improved transport device wherein the gripping devices can be easily controlled for gripping and delivering the original.

In accomplishing the foregoing objects, there has been provided according to the invention a device for transporting an original to be copied while resting on a supporting surface, preferably a rotating drum, in a reproduction apparatus, comprising: a shaft extending across the width of the supporting surface and being arranged in spaced relationship substantially parallel therewith; a plurality of means in spaced attachment along the shaft and responsive to rotation of the shaft for clamping the leading edge of the original; a flexible strip member commonly covering the clamping means and being adapted to protect the leading edge of the original in the clamped position; means engaging one end of the shaft in an original-receiving position for opening and closing the clamping means by rotating the shaft; and means engaging one end of the shaft in an original-releasing position for opening the clamping means by rotating the shaft.

In one embodiment, the drum has a lateral recess extending across substantially its entire width, and the shaft and clamping means are disposed within the recess in the drum. In another embodiment, the device further comprises means including a bracket on each end of the drum for supporting the shaft in spaced relationship above the surface of the drum and means for selectively coupling the support means with the axis of rotation of the drum for rotation therewith.

Preferably, each of the clamping means comprises a stationary clamping bar and a gripping finger connected to the shaft, the gripping fingers preferably comprising curved outside surfaces adapted to the curvature of the support drum.

DETAILED DESCRIPTION OF PREFERRED EMBODIMENTS

According to the invention, the foregoing objectives are achieved by means of clip-shaped gripping elements which have a common flexible covering strip to protect the leading edge of the original and which are arranged on a gripper shaft which extends across the width of the support surface and is parallel with this surface. A first control unit is provided engaging one end of the gripper shaft and turning the shaft in order to open or close the clips. A second control unit is provided in the path of the gripper shaft, which control unit is adapted to turn the shaft so that the clips are opened and the original is released.

The present invention has the advantages that the leading edge of the original is held by the individual clips with a substantially uniform gripping force, irrespective of different thicknesses across the width of the original, and that by the common flexible strip covering the clips, the leading edge of the original is protected in such a way that it cannot bulge and/or tear during transport of the original and existing damage of this kind will not be aggravated. In addition, the gripping system is easily accessible and adjustable, and the number of clips can be freely chosen. The use of two control units for actuating the gripping device yields the advantage that, by means of minor technical expenditure, the original is seized near the vertex of the support drum and is delivered close to the lowest point of the support drum.

Figure 1:
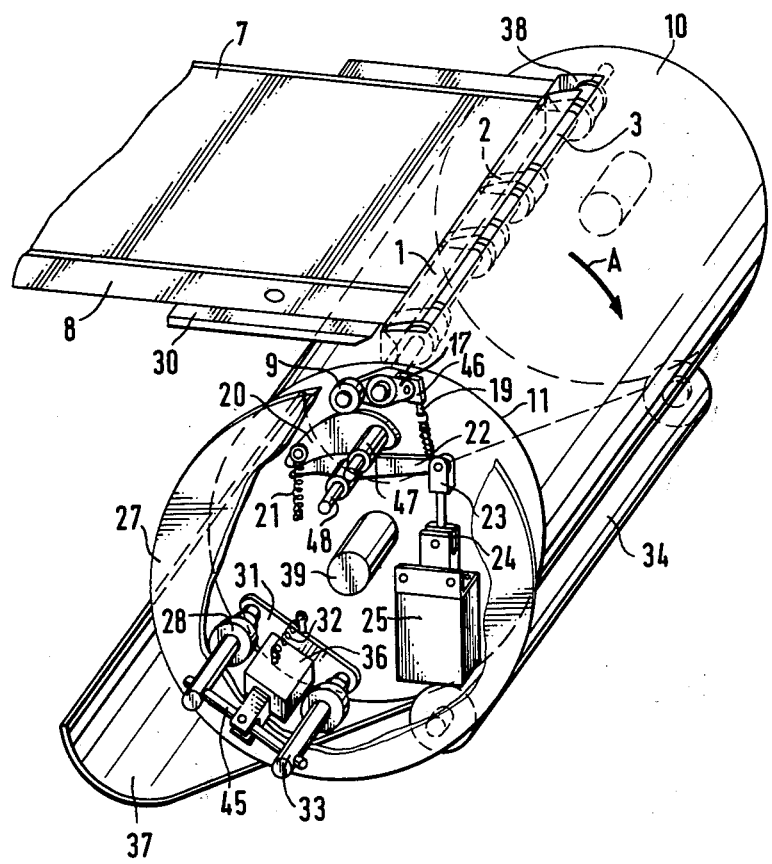
FIG. 1 is a perspective view of one embodiment of the invention, with some parts broken away and some parts shown in dashed lines for clarity.
Figure 2:
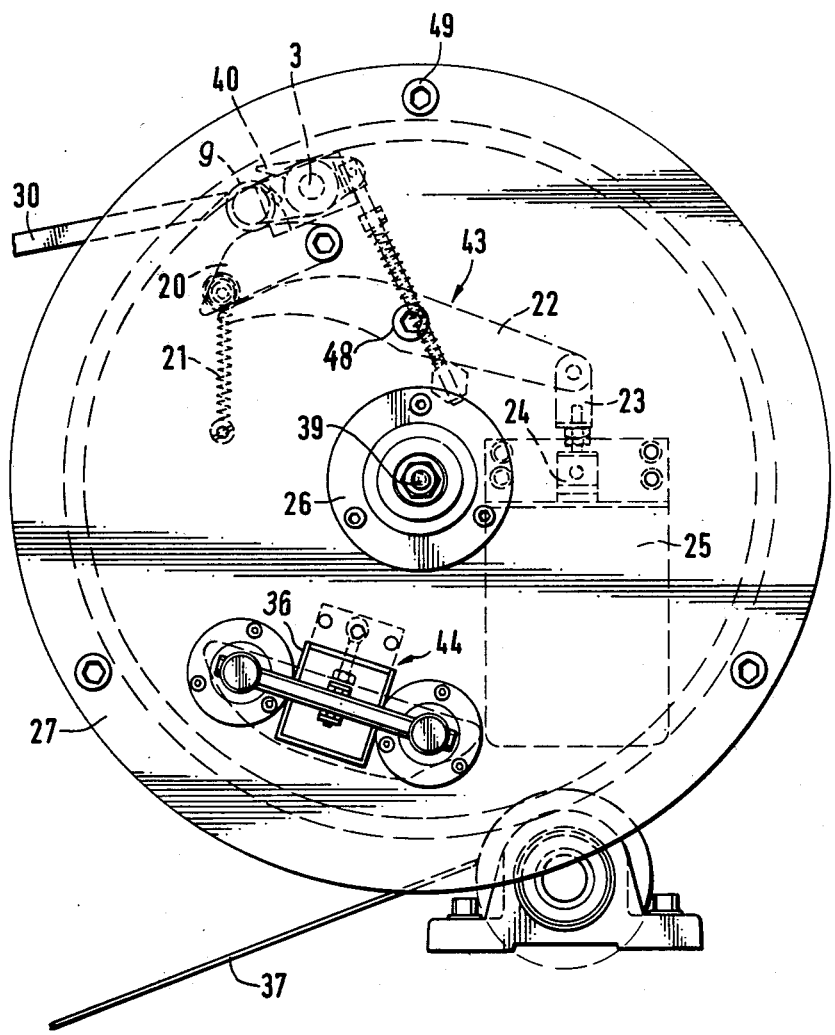
FIG. 2 is a side view of the embodiment according to FIG. 1.
Figure 4:
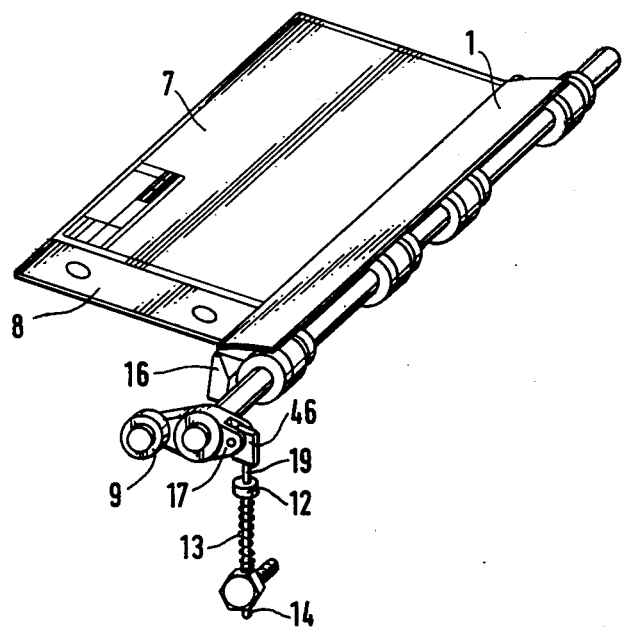
FIG. 4 is an isolated perspective view of elements contained in the first control unit for actuating the gripping device.

Turning now to the drawings, a first example of an embodiment of the invention shown in FIGS. 1 and 2 incorporates a support drum 10 over the shell or support surface 11 of which an original 7 is led past an exposure station (not shown in this figure) and underneath a pressure roller 34. A recess 38 is provided in the support surface 11, which recess extends across nearly the entire width of the support drum 10 and accommodates a gripper shaft 3. The gripper shaft is disposed at a distance from and parallel to the shaft 39 of the support drum 10, which drum shaft penetrates the end faces of the drum 10. The projecting ends of the shaft serve to support the drum in a bearing 26 (FIG. 2) arranged in a mounting cover 27 which is fastened to the side walls of the copying or reproducing machine by means of fastening screws 49. The gripper shaft 3, supported by its ends in the recess 38, is equipped with approximately equally spaced gripping clamp assemblies 2 which are opened and closed by way of a first control unit 43. A second control unit 44, disposed in the path of the gripper shaft opens the clamps 2 in order to deliver the original 7. The clamps 2 are designed in two parts. They comprise a stationary clamping bar 16 (FIG. 4) inside the recess 38 in the support drum 10 and gripping fingers 40 connected to the gripper shaft 3.

A flexible strip 1 is stretched over the clamps 2 and the gripping fingers 40, which strip covers and at the same time protects the leading edge of the original fed into the gripping device. This strip may be made of a flexible foil, (e.g., synthetic resin) rubber or thin metal sheet.

The outsides of the closed clamps 2 advantageously are flush with the support surface 11 of the drum, in such a manner that the flexible strip 1 does not project beyond the support surface 11 of the drum, when the device is closed. The strip 1 must be flexible because a variable clearance in each clamp 2 between a driving ring 4 and the gripping finger 40 on the gripper shaft 3 has to be compensated for when the shaft is turned, as will be explained below. Preferably, the strip 1 is attached only to the two clamps 2 at the ends of the shaft; however, it may also be connected to each clamp 2.

At one end of the gripper shaft 3 a control lever 17 (FIG. 4) is provided carrying at one of its ends an actuating roller 9 and at the other end a connecting plate 46 with a lifting rod 19. The connecting plate 46 is inserted into a slot in the control lever 17 and is fastened to it. The lifting rod 19 is encircled by a compression spring 13 which with one of its ends abuts a stop 12, adjustably mounted on the lifting rod, and with its other end is in contact with a bearing 14 of the lifting rod 19, which, e.g., is provided in the end face of the support drum 10.

The first control unit 43 serving to turn the gripper shaft 3 comprises a cam means 20 on whose top edge the actuating roller 9 rides and moves the control lever 17 up and down so that the gripper shaft 3 is turned for opening or closing the grippers 40. The cam means 20 is pressed by a tension spring 21 onto an operating lever 22 which, by way of a forked element 23 and a spacer 24, is connected to a first lifting element 25. The cam means 20 and the operating lever 22 are supported by pins 47 and 48 in a mounting cover 27 to which one end of the tension spring 21 is also fastened. The first lifting element 25 is likewise attached to the inside of said mounting cover 27 arranged at a distance from one end face of the support drum 10. Thus the entire first control unit 43 is disposed on the inside of the removable mounting cover 27.

The second control unit 44 which penetrates the mounting cover 27 comprises a second lifting element 36 to which a connecting rod 45 is fastened carrying at its each end one guide rod 33 for a cam plate 31. The guide rods 33 are supported in guide bushings 28 and their ends are connected to the cam plate 31 which by a tension spring 32 is pulled towards the mounting cover 27. The second control unit 44 is similarly attached to the mounting cover 27. This cover may at the same time serve as a support for the shaft 39 of the support drum 10 and may be completely removable from the support drum. This arrangement provides for easy mounting and maintenance of the control units 43 and 44 and, in addition, it has the advantage that the suppurt drum 10 can be slipped onto the shaft 39 and thus may be easily exchanged.

Resting against the support drum 10 is a pressure roller 34 which ensures that the original 7 is invariably in contact with the support surface 11 during transport. Underneath the support drum 10, a delivery tray 37 for the original 7 is provided.

In the embodiment of the invention shown in FIGS. 1 and 2, the gripping fingers 40 have curved outside surfaces adapted to the curvature of the support drum 10, thus ensuring that the closed grippers do not project beyond the support surface 11 of the drum 10.

Figure 5:
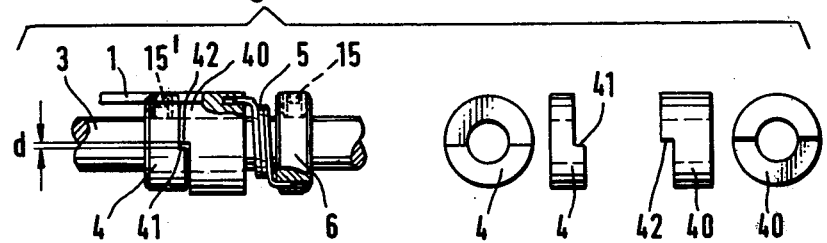
FIG. 5 is a detailed plan view of isolated parts of the gripping device.

As shown by FIG. 5, each gripping finger 40 is prestressed by a spring 5 slipped onto the gripper shaft 3. One end of the spring 5 is fastened in a locking ring 6 on the gripper shaft 3, while the other end engages the gripping finger 40. The locking ring 6 can be moved along the gripper shaft 3 and is locked in position on the gripper shaft 3 by means of a countersunk setscrew 15, e.g., a threaded pin. On the other side of the gripping finger 40, the displaceable driving ring 4 is locked in position on the gripper shaft 3 by a setscrew 15' which is countersunk in the driving ring 4. The side of the driving ring 4 facing the gripping finger 40 is provided with a step 41, which may be formed by milling. The gripping finger 40 is also provided with a milled-in step 42, executed in such a manner that it is complementary to the step 41 in the driving ring 4. When the clamps 2 are closed and opened there is — in the radial direction of the gripper shaft — a variable clearance or distance "d" between the two steps 41 and 42. The maximum value of this distance exceeds or equals the difference between the maximum and minimum thicknesses of the original 7. In case of an original 7 with a cardboard strip 8 on one side, so that it can be kept suspended in a special cabinet, the maximum value of this distance "d" between the two steps 41 and 42 must be chosen to equal at least the difference of the thickness of the cardboard strip minus the thickness of the paper. Thus, the first gripping finger 40 clamping the cardboard strip 8 shows the largest distance "d", whereas the remaining gripping fingers 40 holding the paper, by activation of the coupling surfaces of the step 41 in the driving ring 4 and of the step 42 provided in each gripping finger 40, close more tightly than the first gripping finger, e.g., have a smaller distance "d". The pressure exerted on the original 7 by the remaining gripping fingers 40 is thus approximately equal to the pressure exerted by the first gripping finger 40. In order to ensure a different closing relative to the distance "d" of the individual gripping fingers 40, the spring force of the compression spring 13 must exceed the sum of the spring forces of all of the springs 5 prestressing the gripping fingers 40.

The difference in thickness between the cardboard strip and the paper of the original 7 causes in the strip 1, inter alia, a tension parallel to the gripper shaft 3. An increase of this tension is limited due to the fact that during axial displacement, when closing the gripping finger 40, the spring 5 exerts an additional compression on the locking ring 6, resulting in an adjustment of length of the strip.

Figure 3:
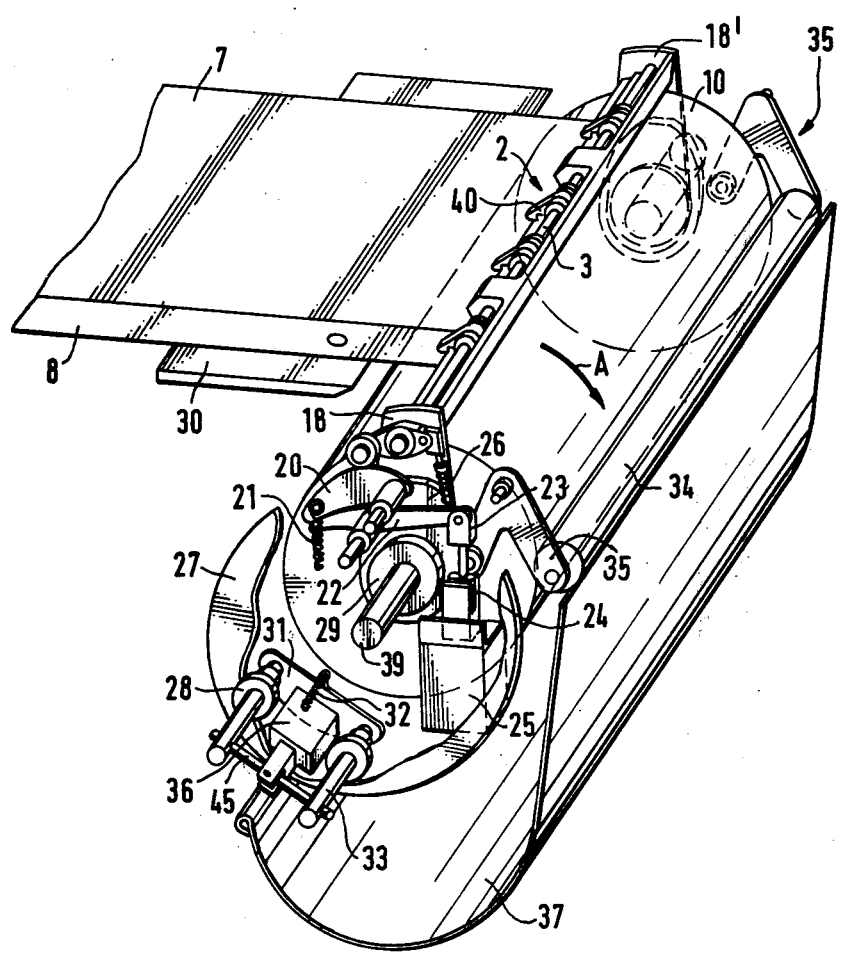
FIG. 3 is a perspective view of another embodiment of the invention, again partly broken away.

In the embodiment of the invention shown in FIG. 3, the gripping device is arranged above the support surface 11 of the drum 10, in such a manner that the ends of the gripper shaft 3 are supported in two driving brackets 18 and 18'. These driving brackets are attached to the drum shaft 39 close to the end faces of the support drum 10 by way of a diagrammatically shown electrical coupling and braking means 29. This coupling and braking means 29 is adapted for programmed control of the stopping and entraining functions of the gripping device with respect to the constantly rotating support drum 10 in the course of a copying program. In this embodiment, the pressure roller 34 for the original 7 is fixed at its ends to angular butt straps 35, which are pivotably disposed at either end face of the support drum 10. Elements identical to those shown in the embodiments according to FIGS. 1 and 2 are designated by the same reference numbers in the representation of this further embodiment.

When an original 7 is to be copied, it is led into the opened gripping device over a feed table 30. For this purpose, the first lifting element 25 of the first control unit 43 is energized so that the operating lever 22 presses the cam means 20 and the actuating roller 9 upwardly, against the force of the tension spring 21. As a result, the gripper shaft 3 is turned clockwise and the clamps 2 are opened. The leading edge of the original 7 actuates a switch (not shown) which initiates the starting impulse. As a result, the first lifting element 25 is no longer supplied with current. The tension spring 21 then pulls the cam means 20, the operating lever 22, the forked element 23 and the spacer 24 into a predetermined position, while the actuating roller 9 rides over the top edge of the cam means 20. At the same time, the compression spring 13 is pressed upwardly and closes the gripping fingers 40 via the operating lever 17, against the force of the springs 5, by turning the gripper shaft 3 counterclockwise. Simultaneous with closing of the gripping fingers 40, the support drum 10 with the clamped original 7 begins to rotate in the direction of the arrow A and passes underneath the pressure roller 34.

As soon as the original 7 is to be delivered, as may have been predetermined prior to starting the copying cycle by means of a preselector switch (not shown), the second lifting element 36 of the second control unit 44 pulls the cam plate 31 into the path of the actuating roller 9 by way of the connecting rod 45 and the guide rods 33. The roller 9 then rides over the elevated path of the cam plate 31 and, by means of the operating lever 17, the gripper shaft 3 is turned clockwise and the clamps 2 are opened. The leading edge of the original 7 is thus released and, by the pressure roller 34 and the continuously rotating support drum 10, the original is conveyed into the delivery tray 37. When the actuating roller 9 has left the cam plate 31, the clamps 2 are closed by the force of the compression spring 13. The support drum 10 is stopped in a predetermined position and is ready for the next copying cycle. For this purpose, the clamps 2 are reopend by the first lifting element 25, and the gripping device is prepared to seize another original 7. If repeated copying is required, i.e., if the original 7 has to circulate in the machine several times, the second lifting element 36 of the second control unit 44 is left currentless until the original is to be delivered.

The lifting elements 25 and 36 are preferably electromagnets with armatures; however, pneumatic or hydraulic lifting elements may optionally be provided in their place.

What is claimed is:

1. A device for transporting an original to be copied while resting on a supporting surface in a reproduction apparatus, comprising:
   a shaft extending across the width of the supporting surface and being arranged in spaced relationship substantially parallel therewith;
   a plurality of means in spaced attachment along said shaft and responsive to rotation of the shaft for clamping the leading edge of the original;
   a flexible strip member commonly covering said clamping means and being adapted to protect the leading edge of the original in the clamped position;
   means engaging one end of said shaft in an original-receiving position for opening and closing said clamping means by rotating said shaft; and
   means engaging one end of said shaft in an original-releasing position for opening said clamping means by rotating said shaft.

2. The device according to claim 1, wherein the supporting surface comprises the outer circumferential surface of a drum, the drum having a lateral recess extending across substantially its entire width, and wherein said shaft and said clamping means are disposed within the recess in the drum.

3. The device according to claim 2, further comprising a removable cover member for the drum, and wherein said clamp opening and closing means and said clamp opening means are mounted on the cover.

4. The device according to claim 2, wherein the outer surfaces of said clamping means are flush with the support surface when the clamping means are closed.

5. The device according to claim 2, wherein each of said clamping means comprises a stationary clamping bar disposed in the recess in the support drum and a gripping finger connected to said shaft.

6. The device according to claim 1, wherein the supporting surface comprises the outer circumferential surface of a rotatable drum, wherein said device further comprises means including a bracket on each end of the drum for supporting said shaft in spaced relationship above the surface of the drum and means for selectively coupling said support means with the axis of rotation of the drum for rotation therewith.

7. The device according to claim 5, wherein said gripping fingers comprise curved outside surfaces adapted to the curvature of the support drum.

8. The device according to claim 7, wherein each of said clamping means further comprises a locking ring attached to said shaft, and a spring coaxially surrounding said shaft, one end of said spring being fastened to said locking ring and the other end engaging said gripping finger.

9. The device according to claim 8, wherein each of said clamping means further comprises a positionable driving ring locked in position on said shaft adjacent to said gripping finger, the side of the driving ring facing the gripping finger including a step, and wherein said gripping finger comprises a step complementary to said step in the adjacent side of the driving ring.

10. The device according to claim 9, wherein the driving ring adjoins the gripping finger, and wherein in the radial direction of the shaft a distance (d) exists between the step provided in the driving ring and the step in the gripping finger, which distance (d) is variable in accordance with turning of the shaft.

11. The device according to claim 3, wherein said clamp opening and closing means comprises an actuating roller rotatably attached to the end of said shaft, a cam member pivotably mounted adjacent one end of said shaft so that said roller rides on the top edge thereof, a cam actuating lever attached to said cam and a means attached to said lever for driving said lever.

12. The device according to claim 11, wherein said lever further comprises a forked element pivotably attached to the lever and a spacer element connecting said forked element with said driving means.

13. The device according to claim 12, further comprising a control lever rotatably mounted on one end said shaft and carrying at one end said actuating roller, a connecting plate attached to the other end of said control lever and a lifting rod connected to said connecting plate.

14. The device according to claim 13, wherein said control lever includes a slot and the connecting plate of the lifting rod engages in said slot in the control lever and is connected to said control lever.

15. The device according to claim 14, wherein said lifting rod includes an adjustable stop adjacent to said control lever and said device further comprises a compression spring encircling the lifting rod, said spring abutting one end said adjustable stop and at its other end contacting a bearing surface of said cover member.

16. The device according to claim 11, wherein said clamp opening and closing means and said clamp opening means are arranged on the inside of said cover member and wherein said drum is rotatably supported by said cover member.

17. The device according to claim 16, wherein said cover member is arranged at a distance from one of the end faces of the drum.

18. The device according to claim 17, wherein said clamp opening means comprises a cam plate and means for selectively moving said cam plate into the path of said actuating roller at a position desired for release of the original.

19. The device according to claim 18, wherein said selective moving means comprises a pair of guide rods attached to said cam plate, a connecting rod between said guide rods and connecting them, and a lifting device operatively connected to said connecting rod.

20. The device according to claim 15, wherein each of said clamping means further comprises a spring connection to said shaft, and wherein the spring force of said compression spring exceeds the sum of the spring forces of each of said spring connections of said clamping means.

21. The device according to claim 1, wherein said strip member is attached to at least the two end clamping means on said shaft.

* * * * *